United States Patent
Ha et al.

(10) Patent No.: US 10,157,494 B2
(45) Date of Patent: Dec. 18, 2018

(54) APPARATUS AND METHOD FOR PROCESSING VIRTUAL POINT LIGHTS IN AN IMAGE

(71) Applicant: Samsung Electronics Co., Ltd., Suwon-si (KR)

(72) Inventors: In Woo Ha, Yongin-si (KR); MinSu Ahn, Seoul (KR); Hyoung Euk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 186 days.

(21) Appl. No.: 14/623,954

(22) Filed: Feb. 17, 2015

(65) Prior Publication Data
US 2015/0235410 A1    Aug. 20, 2015

(30) Foreign Application Priority Data
Feb. 20, 2014    (KR) .......................... 10-2014-0019763

(51) Int. Cl.
*G06T 15/50* (2011.01)
*G06T 15/60* (2006.01)
*G06T 15/04* (2011.01)
*G06T 15/40* (2011.01)
*G06T 15/55* (2011.01)

(52) U.S. Cl.
CPC .............. *G06T 15/60* (2013.01); *G06T 15/04* (2013.01); *G06T 15/40* (2013.01); *G06T 15/55* (2013.01); *G06T 2215/12* (2013.01)

(58) Field of Classification Search
CPC ......... G06T 15/06; G06T 15/50; G06T 15/20; G06T 15/60; G06T 19/00
See application file for complete search history.

(56) References Cited

U.S. PATENT DOCUMENTS

| 2004/0160441 A1* | 8/2004 | Lokovic | G06T 15/06 345/426 |
|---|---|---|---|
| 2011/0012901 A1* | 1/2011 | Kaplanyan | G06T 15/506 345/426 |
| 2012/0299922 A1 | 11/2012 | Ha et al. | |

(Continued)

FOREIGN PATENT DOCUMENTS

| JP | 5085722 B2 | 11/2012 |
|---|---|---|
| KR | 10-2011-0031643 A | 3/2011 |

(Continued)

OTHER PUBLICATIONS

Georgiev et al., "Importance Caching for Complex Illumination", Eurographics, vol. 31, 2012, No. 2.*

(Continued)

*Primary Examiner* — Weiming He
(74) *Attorney, Agent, or Firm* — NSIP Law

(57) ABSTRACT

An image processing apparatus to calculate a visibility with respect to a plurality of virtual point lights (VPL) sampled at a three-dimensional (3D) model includes at least one first VPL included in a screen scene associated with a viewpoint to render and at least one second VPL not found in the screen scene, and may calculate a first probability obtained by calculating a visibility between a first area including the first VPL and a first point with respect to the at least one first VPL.

20 Claims, 13 Drawing Sheets

(56) References Cited

U.S. PATENT DOCUMENTS

| | | | | |
|---|---|---|---|---|
| 2014/0267271 | A1* | 9/2014 | Billeter | G06T 15/005 345/426 |
| 2014/0369559 | A1* | 12/2014 | Liu | G06K 9/00355 382/103 |
| 2015/0117706 | A1* | 4/2015 | Hsieh | G06K 9/6202 382/103 |

FOREIGN PATENT DOCUMENTS

| | | |
|---|---|---|
| KR | 10-2011-0032366 A | 3/2011 |
| KR | 10-2012-0007398 A | 1/2012 |
| KR | 10-2012-0062542 A | 6/2012 |
| KR | 10-2013-0003376 A | 9/2013 |

OTHER PUBLICATIONS

Laine et al., "Incremental Instant Radiosity for Real-Time Indirect Illumination", Eurographics Symposium on Rendering, 2007.*

Dachsbacher et al., "Reflective Shadow Maps", I3D '05 Proceedings of the 2005 symposium on Interactive 3D graphics and games, Apr. 3-6, 2005, p. 203-231.*

Walter et al., "Lightcuts: A Scalable Approach to Illumination", SIGGRAPH '05 ACM SIGGRAPH 2005 Papers, vol. 24 Issue 3, Jul. 31, 2005, p. 1098-1107.*

Tomas Akenine-mokker, "Real-time rendering", 2nd edition, ISBN: 1568811829, 2002.*

Carsten Dachsbacher, Splatting indirect illumination, published in 2006.*

Alex J. Champandard, Occupancy Grids and Emergent Search Behavior for NPCs, http://aigamedev.com/open/tutorials/occupancy-grid-prototype/, posted on Apr. 28, 2011.*

Nichols, G. et al., "Hierarchical Image-Space Radiosity for Interactive Global Illumination," Proceedings of the Twentieth Eurographics Symposium on Rendering, vol. 28, No. 4, 2009 (9 pages, in English).

* cited by examiner

500

APPARATUS AND METHOD FOR PROCESSING VIRTUAL POINT LIGHTS IN AN IMAGE

CROSS-REFERENCE TO RELATED APPLICATIONS

This application claims the priority benefit of Korean Patent Application No. 10-2014-0019763, filed on Feb. 20, 2014, in the Korean Intellectual Property Office, the disclosure of which is incorporated herein by reference.

BACKGROUND

1. Field

The following description relates to global illumination-based rendering with respect to a three-dimensional (3D) model, and more particularly, to an indirect illumination-based rendering with respect to a 3D model, such as a radiosity method.

2. Description of the Related Art

In recent times, a growing interest in real-time rendering with respect to a three-dimensional (3D) model is prominent in various fields such as 3D games, virtual reality animations, or films.

One 3D rendering method includes a radiosity method based on global illumination. The radiosity method enhances a rendering quality based on direct illumination by a direct light source present in a 3D model and indirect illumination by a reflective light obtained through the direct illumination being reflected off an object or by diffused reflection.

In this instance, virtual point light (VPL) sampling to dispose VPLs representing indirect illumination effects at a predetermined position in a 3D model is performed, and a portion in which the VPLs influence color values of points of an object is applied to a rendering.

In an existing method, a visibility test has been required to determine whether the VPLs influence a predetermined point or pixel, thus resulting in a great quantity of operations.

SUMMARY

The foregoing and/or other aspects may be achieved by an image processing apparatus including a visibility probability distribution calculator to calculate a first probability of a visibility between a first area including a first virtual point light (VPL) sampled at a three-dimensional (3D) model and a first point to be rendered, and a renderer to apply the first probability to the visibility of the first VPL with respect to the first point, and to render a color value of the first point by the first VPL.

The visibility probability distribution calculator may include a point sampler to sample a plurality of second points to the first area, a visibility tester to test a visibility between the first point and the plurality of second points, and a visibility probability map generator to calculate the first probability using a ratio of a point determined to have a visibility as a result of the visibility test from among the plurality of second points.

The visibility tester may test the visibility using a depth map, obtained as a result of differed rendering of the 3D model from a viewpoint associated with the rendering.

The visibility probability distribution calculator may include an area setter to divide a screen scene which is obtained by rendering the 3D model from the viewpoint associated with the rendering, into a plurality of areas including the first area.

The area setter may divide, into the plurality of areas, an area in which a distance from the first point in the screen scene is less than a first threshold value.

The visibility probability distribution calculator may process the first probability to be zero with respect to an area in which a distance from the first point in the screen scene is greater than the first threshold value.

The first VPL may be at least one of VPLs included in the screen scene obtained by rendering the 3D model from the viewpoint associated with the rendering from among a plurality of VPLs sampled for the 3D model.

The image processing apparatus may further include a VPL filter to classify the plurality of VPLs through filtering by distinguishing a VPL included in the screen scene from a VPL not found in the screen scene from among the plurality of VPLs.

The image processing apparatus may further include a shadow map-based visibility calculator to obtain a shadow map with respect to at least one second VPL not found in the screen scene from among the plurality of VPLs, and calculate a visibility between the at least one second VPL and the first point using the shadow map.

The image processing apparatus may further include a VPL sampler to perform an importance-based adaptive VPL sampling on the plurality of VPLs to the 3D model based on at least one of a texture of an object point included in the 3D model and brightness of a direct light source that provides a light to the 3D model.

The renderer may render the color value of the first point by the first VPL when the first point is disposed within a first radius set with respect to the first VPL.

The first radius may be adaptively set by at least one of brightness of a direct light associated with sampling the first VPL, a reflectivity at a position of the first VPL, and an object texture at the position of the first VPL.

The foregoing and/or other aspects may be achieved by an image processing apparatus including an area setter to divide a screen scene which is obtained by rendering a 3D model from a viewpoint associated with rendering of a first point into a plurality of areas, a point sampler to sample a plurality of second points to a first area from among the plurality of areas, a visibility tester to test a visibility of the first point and the plurality of second points, and a visibility probability map generator to calculate a first probability of a visibility between the first area and the first point using a ratio of a point having the visibility between the first point from among the plurality of second points.

The image processing apparatus may further include a renderer to apply the first probability to a visibility of a first VPL with respect to the first point when rendering a color value of the first point by the first VPL included in the first area from among one or more VPLs sampled for the 3D model.

The foregoing and/or other aspects may be achieved by an image processing method in which an image processing apparatus renders a color value of a first point comprised in a 3D model, the method including calculating a visibility probability distribution by calculating a first probability of a visibility between a first area comprising a first VPL sampled for a 3D model and a first point, and applying the first probability to a visibility of the first VPL with respect to the first point, and rendering a color value of the first point by the first VPL.

The calculating of the visibility probability distribution may include setting an area to be divided, into a plurality of areas, a single screen scene obtained by rendering the 3D model from a viewpoint associated with the rendering, point sampling to sample a plurality of second points to the first area from among the plurality of areas, visibility testing to test a visibility of the first point and the plurality of second points, and calculating the first probability of the visibility between the first area and the first point using a ratio of a point having the visibility between the first point from among the plurality of second points.

The first VPL may be at least one of VPLs comprised in the screen scene obtained by rendering the 3D model from the viewpoint associated with the rendering from among the plurality of VPLs sampled for the 3D model.

The image processing method may further include VPL filtering to classify the plurality of VPLs by distinguishing a VPL comprised in the screen scene from a VPL not found in the screen scene from among the plurality of VPLs.

The image processing method may further include calculating a shadow map-based visibility to obtain a shadow map with respect to at least one second VPL not found in the screen scene from among the plurality of VPLs, and to calculate a visibility between the at least one second VPL and the first point using the shadow map.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
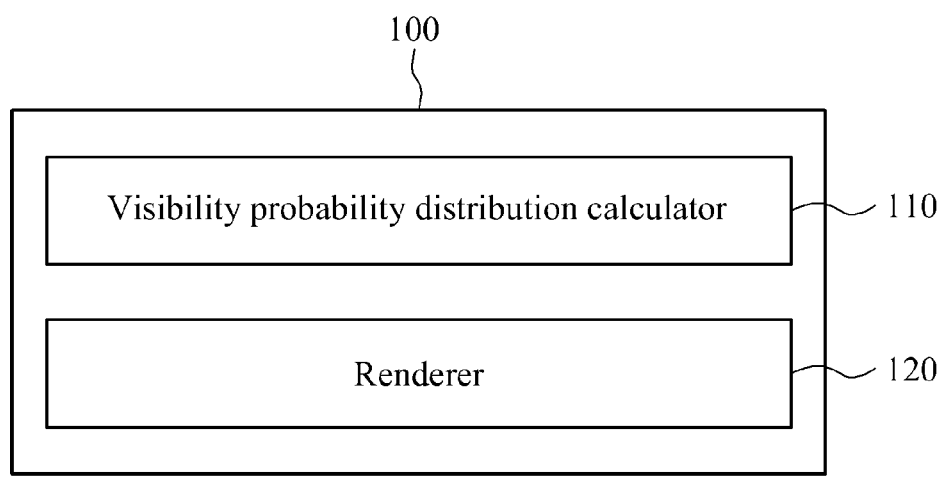
FIG. 1 illustrates an image processing apparatus according to example embodiments.

Reference will now be made in detail to embodiments, examples of which are illustrated in the accompanying drawings, wherein like reference numerals refer to like elements throughout. Example embodiments are described below to explain the present disclosure by referring to the figures.

FIG. 1 illustrates an image processing apparatus 100 according to example embodiments.

Referring to FIG. 1, the image processing apparatus 100 applies an example of effects of global illumination based on a radiosity method to a rendering, and modifications may be made to the example in various forms.

For example, the image processing apparatus 100 applies a virtual point light (VPL) that represents natural phenomena, such as incident light reflected off of a three-dimensional (3D) model to a rendering.

In the following description throughout the specification, unless otherwise indicated, the disposing of the VPL in a 3D model or a 3D space may be referred to as "sampling". A color value and/or a brightness change in an object on the 3D model due to the VPL may be applied to a rendering.

For example, a plurality of VPLs is assumed to be sampled for a 3D model. A color value of a first point by a direct light and the color value of the first point by an indirect light, for example, the plurality of VPLs, are both used to calculate the color value of the first point to render.

Color value shading of the first point by one of the plurality of VPLs, for example, a first VPL, is calculated by Equation 1.

$$C_1 = \frac{\{(\vec{v_1} - \vec{p_1}) \cdot \vec{n}_{p1}\} \cdot \{(\vec{p_1} - \vec{v_1}) \cdot \vec{n}_{v1}\} \cdot C_{p1} \cdot C_{v1}}{\|\vec{p_1} - \vec{v_1}\|^2} \cdot \text{Visibility}_{C_1\_v1} \quad \text{[Equation 1]}$$

In Equation 1, $C_1$ denotes a result of the first VPL calculating the color value of the first point. When N number of VPLs influences the first point, a final color value of the first point is rendered by calculating a sum of all C values obtained by Equation 1.

A direction vector $d_1$ from a position $\vec{p_1}$ of the first point towards a position $\vec{v_1}$ of the first VPL and a dot product of a normal vector of the first point are given by Equation 1. Here, the direction vector $d_1$ is represented by Equation 2.

$$d_1 = \frac{(\vec{v_1} - \vec{p_1})}{\|\vec{p_1} - \vec{v_1}\|} \quad \text{[Equation 2]}$$

A direction vector $d_2$ from the position $\vec{v_1}$ of the first VPL towards the position $\vec{p_1}$ of the first point and a dot product of a normal vector $\vec{n}_{v1}$ of the first VPL are given by Equation 1. The direction vector $d_2$ is represented by Equation 3.

$$d_2 = \frac{(\vec{p_1} - \vec{v_1})}{\|\vec{p_1} - \vec{v_1}\|} \quad \text{[Equation 3]}$$

In Equation 1, $C_{p1}$ denotes a color value based on a texture of the first point, and $C_{v1}$ denotes a color value of the sampled first VPL.

When the color value of the first point by the first VPL is $C_1$, and the N number of VPLs influences the first point, the final color value C of the first point by all of the plurality of VPLs is expressed by Equation 4.

$$C = \sum_{j=1}^{N} C_j \quad \text{[Equation 4]}$$

Visibility$_{C1\_v1}$ included in Equation 1 denotes a visibility between the first VPL and the first point. In a related art, the visibility is determined to be zero or "1".

For example, shadow maps with respect to a 3D model are calculated from a VPL viewpoint based on the related art. Here, a portion of the shadow maps verified to have a visibility as a result of the calculation is determined to be "1" and a portion of the shadow maps verified not to have a visibility as the result of the calculation is determined to be zero. However, calculating the shadow maps with respect to all of the VPLs may require a large quantity of operational overhead.

A conventional splatting method may allow a relatively simplified process. In the conventional splatting method, a shadow map is not calculated, and a visibility by a corresponding VPL is determined to be "1" with respect to pixels within a predetermined radius around the corresponding VPL and a visibility by the corresponding VPL is determined to be zero with respect to pixels outside the predetermined radius. However, the simplified process may have a lower accuracy.

Accordingly, example embodiments in which a visibility between a VPL and a point is accurately calculated while minimizing an operational overhead are provided.

According to example embodiments, a visibility probability distribution calculator 110 included in the image processing apparatus 100 divides an area associated with a first point into a plurality of areas, and calculates a visibility probability with respect to the plurality of divided areas.

For example, a first area is assumed to include a first VPL sampled for a 3D model. The visibility probability distribution calculator 110 calculates a probability of the first area being visible from the first point, and stores the calculated probability as a first probability. As used herein, the first probability refers to a value representing a visibility between pixels and/or VPLs included in the first area and the first point.

When such a visibility probability is calculated for a plurality of areas aside from the first area, for example, an area that covers an entire screen scene to be rendered, a visibility probability distribution map is generated.

A renderer 120 performs shading on the first point by the VPLs. As used herein, the shading refers to calculating and superposition of a color value of the first point performed by the VPLs.

In this example, the renderer 120 applies the first probability calculated with respect to the first area to a visibility of the first VPL with respect to the first point. For example, $C_1$ is calculated by substituting the first probability for Visibility$_{C1\_v1}$ in Equation 1.

In the related art, such visibility processing is standardized by determining the visibility between the first VPL and the first point to be zero or "1" based on a shadow map, or determining the visibility between the first VPL and the first point to be "1" when the first VPL is disposed within a predetermined radius from the first point based on the conventional splatting method.

However, according to example embodiments, it is possible to enhance inaccuracy caused by the standardized processing of the visibility to zero or "1" without calculating a reflective shadow map for each VPL.

For example, the first probability is a predetermined real number greater than zero and less than "1".

Descriptions pertaining to a process of calculating a first probability, being a visibility representative of a first area, and generating a visibility probability map obtained by calculating a visibility probability with respect to a plurality of areas will be provided with reference to FIG. 2 and FIGS. 7 through 9.

Descriptions pertaining to shading of a color value with respect to a point using a visibility probability map will be provided later with reference to FIG. 10.

Figure 2:
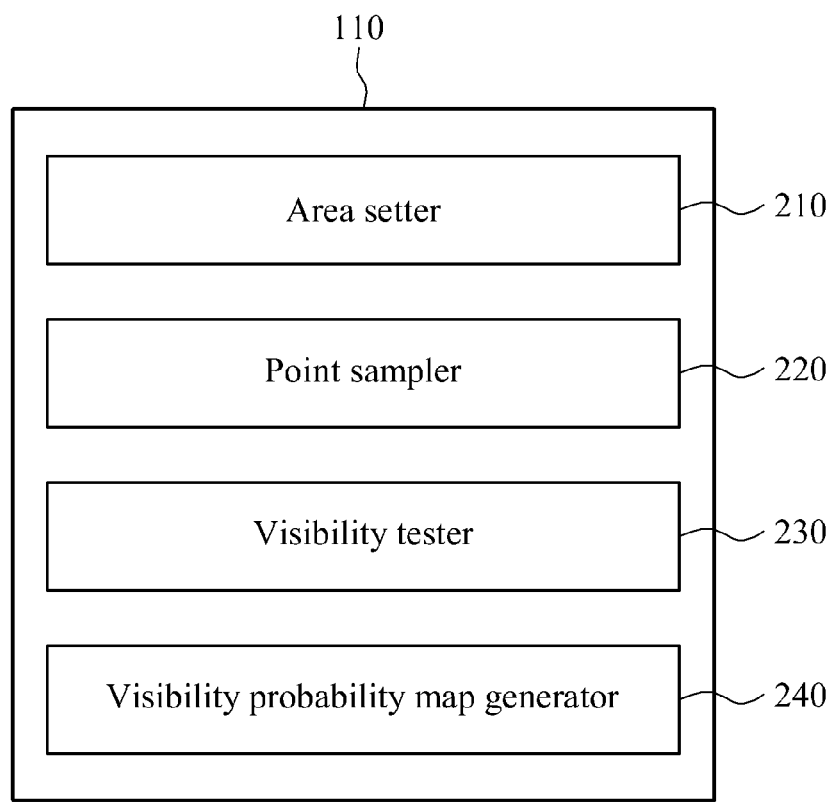
FIG. 2 illustrates an example of a configuration of a visibility probability distribution calculator according to example embodiments.

FIG. 2 illustrates an example of a configuration of a visibility probability distribution calculator 110 according to example embodiments.

An area setter 210 divides, into a plurality of areas, a single screen scene obtained by rendering a 3D model from a viewpoint associated with rendering a first point. For example, the dividing may be performed in a uniform or arbitrary manner, or in an adaptive manner in which the screen scene is divided finely into relatively small pieces close to the first point and divided roughly into relatively large pieces distant from the first point.

Hereinafter, a visibility probability is calculated with respect to the plurality of divided areas.

For example, a process of calculating a first probability, for example, a visibility probability with respect to a predetermined area, for example, a first area, from among a plurality of areas is described.

According to example embodiments, a point sampler 220 arbitrarily samples a plurality of second points to the first area. In this example, the plurality of second points may correspond to a predetermined number of points, for example, ten, being arbitrarily extracted within the first area. However, such sampling is merely exemplary, and any instances in which a plurality of points is extracted from the first area may be included in example embodiments. Descriptions pertaining to the sampling of the second points will be provided with reference to FIG. 7.

A visibility tester 230 tests a visibility of the first point and a visibility for each of the plurality of second points. For example, a depth map obtained as a result of differed rendering in a screen scene may be used in such a visibility test. The visibility test may be performed using the depth map, and descriptions pertaining to a process of performing the visibility test using the depth map will be provided with reference to FIG. 8.

In this example, a ratio of a number of points having a visibility to a number of second points sampled by the point sampler 220 is determined to be a first probability, for example, a visibility probability of the first area. For example, when the number of sampled second points is ten, and a number of second points having "1" visibility is two and a number of second points having "0" visibility is eight as a result of the visibility test with respect to the ten second points, the first probability is determined to be "0.2".

When the visibility between the first area and the first point is determined to be "0.2", a visibility between a first VPL included in the first area and the first point is determined to be "0.2" in a subsequent rendering process.

When the above process of determining the visibility is applied to the entire screen scene divided into the plurality of areas including the first area, a visibility probability map is generated by a visibility probability map generator 240. Descriptions pertaining to the generation of the visibility probability map will be provided with reference to FIG. 9.

When dividing an area with respect to the first point, the area setter 210 divides an area in which a distance from the first point is less than a first threshold value in the screen scene into a plurality of areas. For example, an area in which a distance from the first point is less than 1000 pixels may be divided into a plurality of areas, and remaining areas may not be divided.

Effects of indirect illumination may be nominal in the remaining undivided areas, and/or a probability of a visibility being zero with respect to the remaining undivided areas is likely to be high because the remaining undivided areas are distant from the first point. Accordingly, according to example embodiments, the visibility probability distribution calculator 110 processes a visibility to be zero with respect to an area in which the distance from the first point is greater than the first threshold value in the screen scene.

Figure 3:
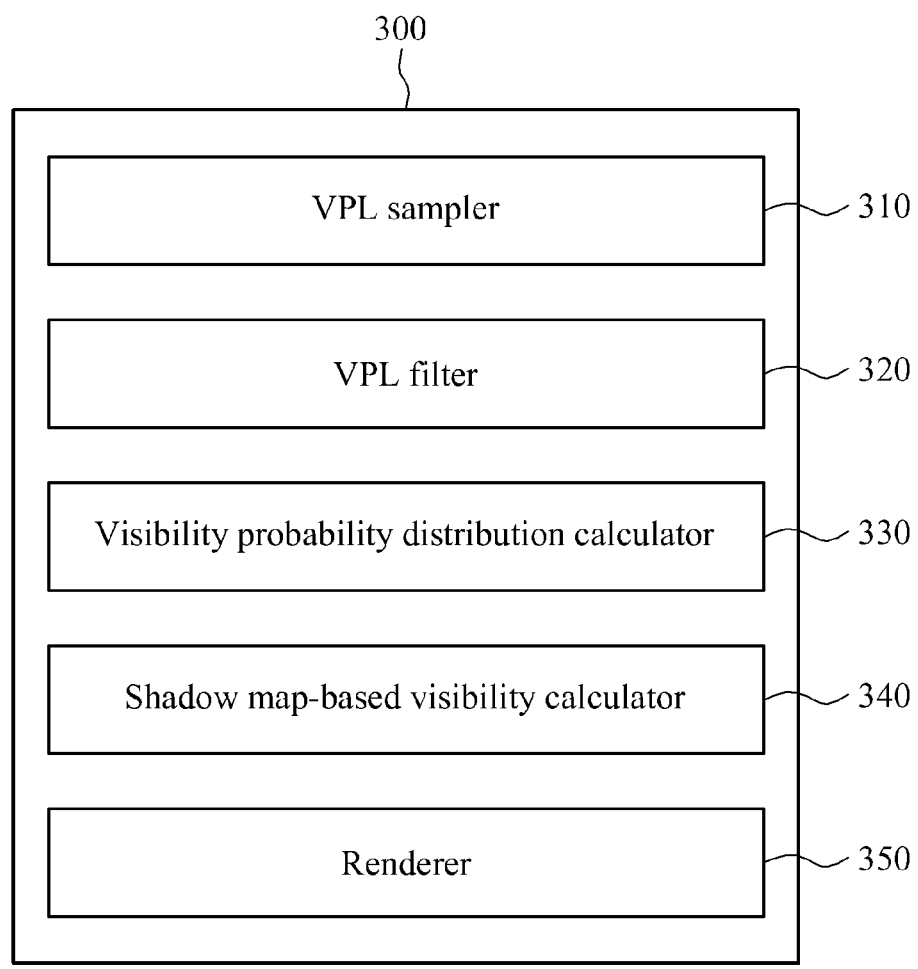
FIG. 3 illustrates an image processing apparatus according to example embodiments.

FIG. 3 illustrates an image processing apparatus 300 according to example embodiments.

A VPL sampler 310 included in the image processing apparatus 300 samples at least one VPL to a 3D model.

In general, the greater a number of VPLs to be set, the greater a rendering quality. However, due to an increased number of operations, a rendering speed may be slower. Accordingly, according to example embodiments, the VPL sampler 310 adaptively samples a VPL based on complexity of a scene. For example, a relatively great number of VPLs is sampled for a portion having higher complexity, and a relatively small number of VPLs is sampled for a portion having lower complexity.

Also, a relatively great number of VPLs is sampled for a portion having a visibility from a camera viewpoint to be rendered, and a relatively small number of VPLs is sampled for a portion absent a visibility from the camera viewpoint to be rendered.

A relatively great number of VPLs is sampled as a reflectivity increases and/or brightness of a color increases based on a texture of the 3D model.

A series of examples described above may be referred to as importance-based adaptive VPL sampling.

According to example embodiments, the image processing apparatus 300 includes a VPL filter 320.

The VPL filter 320 distinguishes first VPLs within a screen scene space obtained by rendering a 3D model from a camera viewpoint to be rendered from second VPLs outside the screen scene space.

A visibility probability distribution calculator 330 of the image processing apparatus 300 calculates a visibility probability distribution with respect to the first VPLs according to example embodiments described with reference to FIGS. 1 and 2.

A shadow map-based visibility calculator 340 generates a reflective shadow map for each of the second VPLs, and a visibility with each point is accurately calculated through use of the reflective shadow map. For example, a shadow map-based visibility calculation may be performed with respect to a portion of the second VPLs having relatively high brightness from among the second VPLs.

A renderer 350 employs a result of calculation performed by the visibility probability distribution calculator 330 when calculating a visibility with the first point with respect to the first VPLs. The renderer 350 employs a result of calculation performed by the shadow map-based visibility calculator 340 when calculating a visibility with the first point with respect to the second VPLs.

Such a process may be understood as radiosity rendering performed with respect to the first point according to example embodiments.

Hereinafter, the radiosity rendering process will be described.

Figure 4:
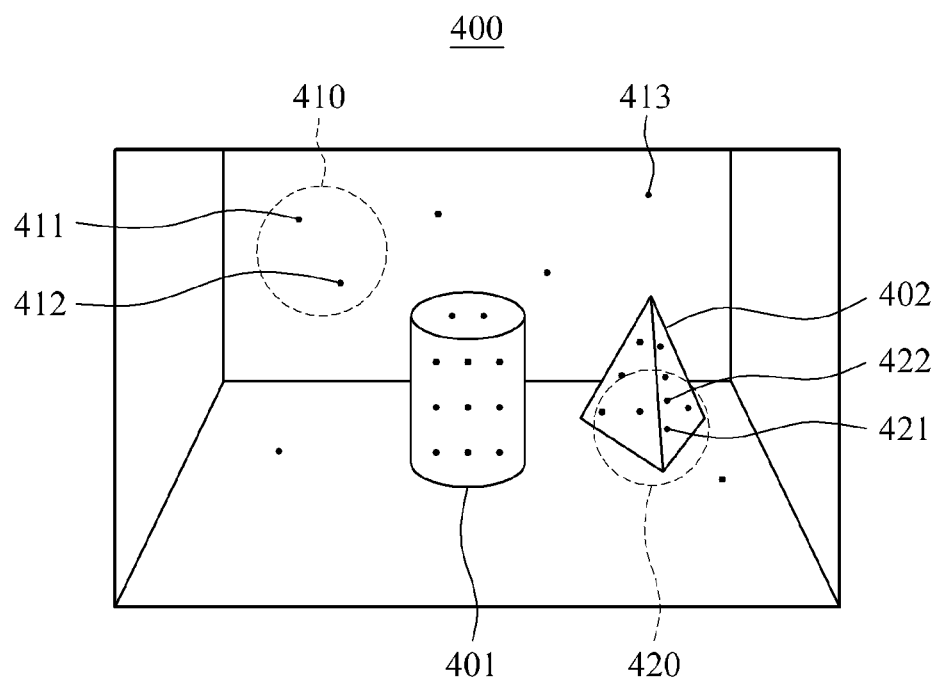
FIG. 4 illustrates a result of sampling a plurality of virtual point lights (VPL) to a three-dimensional (3D) model from a direct light source viewpoint according to example embodiments.

FIG. 4 illustrates a result of sampling a plurality of VPLs to a 3D model 400 from a direct light source viewpoint according to example embodiments.

The plurality of VPLs is sampled for the 3D model 400. The sampling of the plurality of VPLs may refer to the importance-based adaptive VPL sampling performed by the VPL sampler 310 as previously described with reference to FIG. 3.

For example, a relatively great number of VPLs may be sampled for an object 401 and an object 402, and a relatively small number of VPLs may be sampled for remaining areas aside from the objects 401 and 402. Referring to FIG. 4, a relatively small number of VPLs 411 and 412 is sampled for an area 410 when compared to an area 420 in which a relatively great number of VPLs including VPLs 421 and 422 is sampled.

Figure 5:
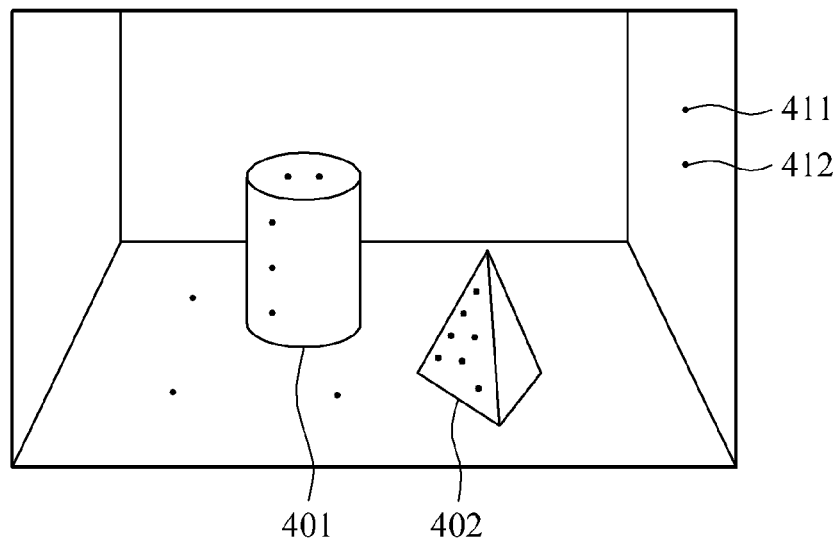
FIG. 5 illustrates a screen scene obtained from a camera viewpoint by rendering the 3D model of FIG. 4.

Screen scene rendering with respect to the 3D model 400 is performed, and a result of the screen scene rendering is illustrated in FIG. 5.

FIG. 5 illustrates a screen scene 500 obtained by rendering the 3D model 400 of FIG. 4 from a camera viewpoint. As used herein, the term "camera viewpoint" may refer to a viewpoint from which an image is rendered.

Referring to FIG. 5, one portion of the VPLs sampled in FIG. 4, for example, first VPLs, is included in the screen scene 500 rendered from the camera viewpoint, and another portion of the VPLs sampled in FIG. 4, for example, second VPLs, is not included in the screen scene 500. For example, the VPLs 411 and 412 of FIG. 4 are included in the first VPLs, and the VPL 413 of FIG. 4 is included in the second VPLs.

According to example embodiments, the VPL filter 320 divides VPLs through filtering by distinguishing a VPL included in the screen scene 500 from a VPL not found in the screen scene 500 as previously described with reference to FIG. 3.

As described above, a visibility is determined by calculating a visibility probability distribution with respect to the first VPLs, and with respect to at least a portion of the second VPLs, a reflective shadow map is calculated and a visibility is determined based on the reflective shadow map.

Hereinafter, a result of performing differed rendering on the screen scene 500 to determine the visibility with respect to the first VPLs is described with reference to FIG. 6.

Figure 6:
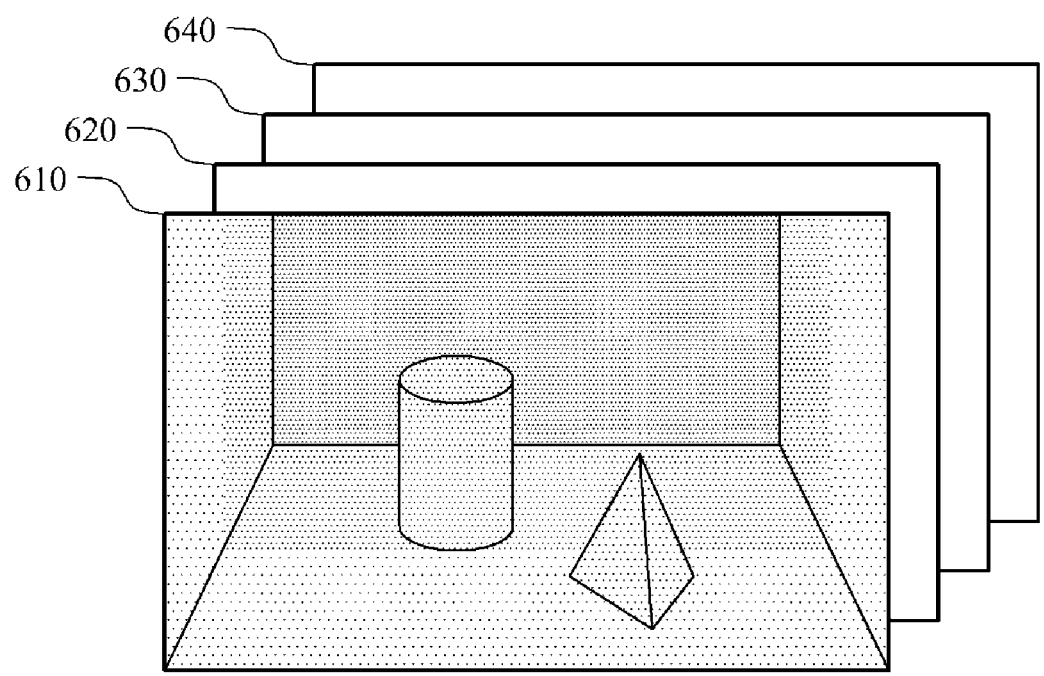
FIG. 6 illustrates a result of differed rendering from the camera viewpoint of FIG. 5.

FIG. 6 illustrates a result of differed rendering from the camera viewpoint of FIG. 5 according to example embodiments.

A depth map 610, a color map 620, a normal map 630, and a position map 640 are generated when the differed rendering is performed on the screen scene 400. The position map 640 is indirectly generated using (X-Y) coordinates and the depth map 610.

The depth map 610 is used for a visibility test, and the color map 620 or the normal map 630 is used for the image rendering process performed by the renderer 120.

Figure 7:
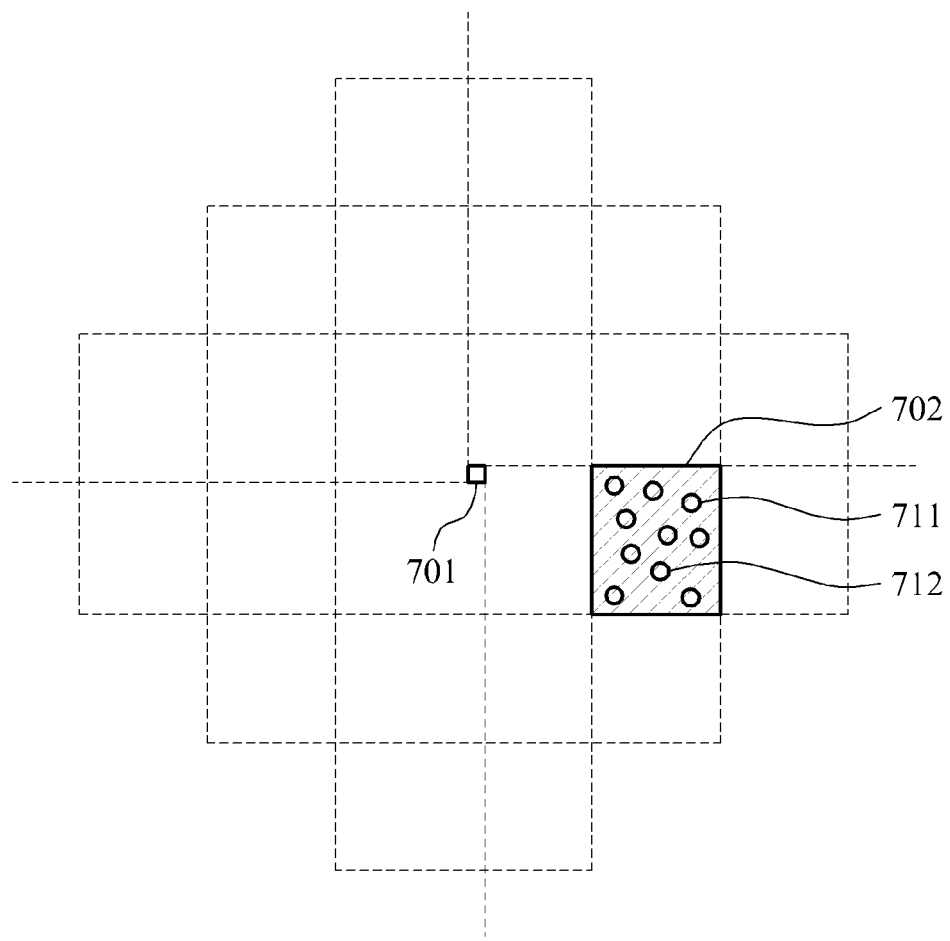
FIG. 7 illustrates a process of setting areas to calculate a visibility probability distribution with respect to a predetermined pixel and sampling a point according to example embodiments.

As used herein, the differed rendering may refer to an exemplary process of indirect illumination rendering for the radiosity method, and may be substituted by another rendering method as necessary. Accordingly, the radiosity method is not limited to some example embodiments provided herein, and various modifications may be made to those example embodiments.

FIG. 7 illustrates a process of setting areas to calculate a visibility probability distribution with respect to a predetermined pixel and sampling a point according to example embodiments.

The area setter 210 of FIG. 2 sets a plurality of areas in a screen scene to calculate a visibility probability distribution with respect to a first point 701. The plurality of areas is indicated by dotted lines as shown in FIG. 7.

As described above, when a shadow map is calculated for each VPL, and a visibility is accurately determined to be zero or "1", a degree of accuracy in a result of the determining is high. However, the calculating of the shadow map and the determining of the visibility may require a large quantity of operational overhead.

When a visibility is determined to be "1" within a predetermined radius around a VPL, and a visibility with respect to remaining areas outside the predetermined radius is determined to be zero, a significant decrease in a number of operations may occur despite a lower degree of accuracy.

Accordingly, according to example embodiments, a plurality of areas is set, and a visibility probability with a first point 701 to be applied to a corresponding area is calculated for each of the plurality of areas as shown in FIG. 7.

For example, a process of calculating the visibility probability with respect to a first area 702 is described.

A plurality of predetermined second points, for example, second points 711 and 712, are sampled within the first area 702. As discussed above, such sampling may be performed in a predetermined manner but is not limited thereto.

A number of second points to be sampled may be predetermined. According to example embodiments, in order to increase accuracy a greater number of second points are sampled within a single area because the second points are closer to the first point 701. For a rapid operation, a fewer number of second points is sampled within a single area because the second points are more distant from the first point 701.

The visibility test with the first point 701 is performed on the sampled second points using the depth map 610 of FIG. 6.

Figure 8:
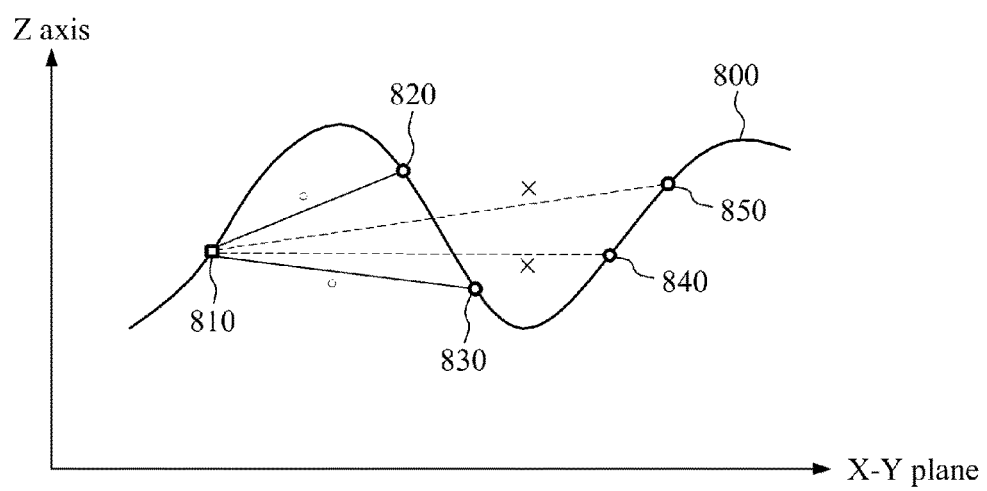
FIG. 8 illustrates a process of testing a visibility of a point sampled for a predetermined pixel according to example embodiments.

FIG. 8 illustrates a process of testing a visibility of a point sampled for a predetermined pixel according to example embodiments.

A visibility test is performed on second points 820, 830, 840, and 850 with respect to a first point 810. The points 820 and 830 of which a visibility is "1" and the points 840 and 850 of which a visibility is zero are determined using the depth map 610 of FIG. 6 in response to a change in depth 800 indicated by a Z axis from among the second points.

A visibility probability with respect to an entire first area is determined by a ratio of a number of points of which a visibility is "1" to a number of entire second points. For example, among ten sampled second points, when four points have "1" visibility and the remaining six points have "0" visibility, a visibility with respect to an entire corresponding area is determined to be "0.4". A visibility probability distribution map is generated by combining probabilities with respect to an entire area because a predetermined visibility probability is applied to a plurality of divided areas.

Figure 9:
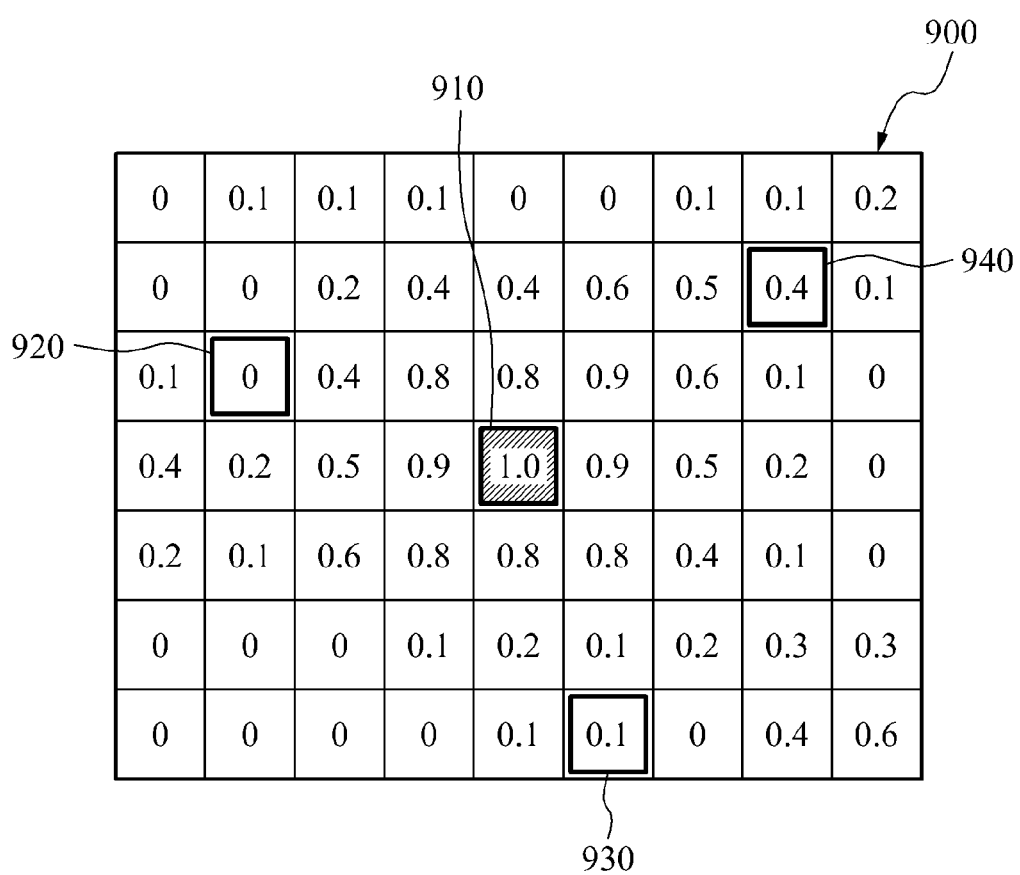
FIG. 9 illustrates an example of a visibility probability distribution map generated by calculating a visibility probability distribution according to example embodiments.

FIG. 9 illustrates an example of a visibility probability distribution map 900 generated by calculating a visibility probability distribution according to example embodiments.

The visibility probability distribution map 900 is generated by calculating a visibility probability distribution with respect to an entire screen scene according to example embodiments described with reference to FIGS. 7 and 8.

VPLs included in an area 920 may not influence a first point associated with the visibility probability distribution map 900 because a visibility of the area 920 is "0".

When a VPL is included in an area 930, the VPL may cause the first point to have a visibility of "0.1" because a visibility of the area 930 is "0.1". In a similar manner, when a VPL is included in an area 940, the VPL may cause the first point to have a visibility of "0.4" because a visibility of the area 940 is "0.4".

A visibility of an area 910 including the first point is "1", and therefore, VPLs included in the area 910 may cause the first point to have a visibility of "1".

Because technical features described with [Equation 1] may be directly applicable to a process in which the visibility of the first point influences a color value, a detailed description will be omitted for conciseness.

Figure 10:
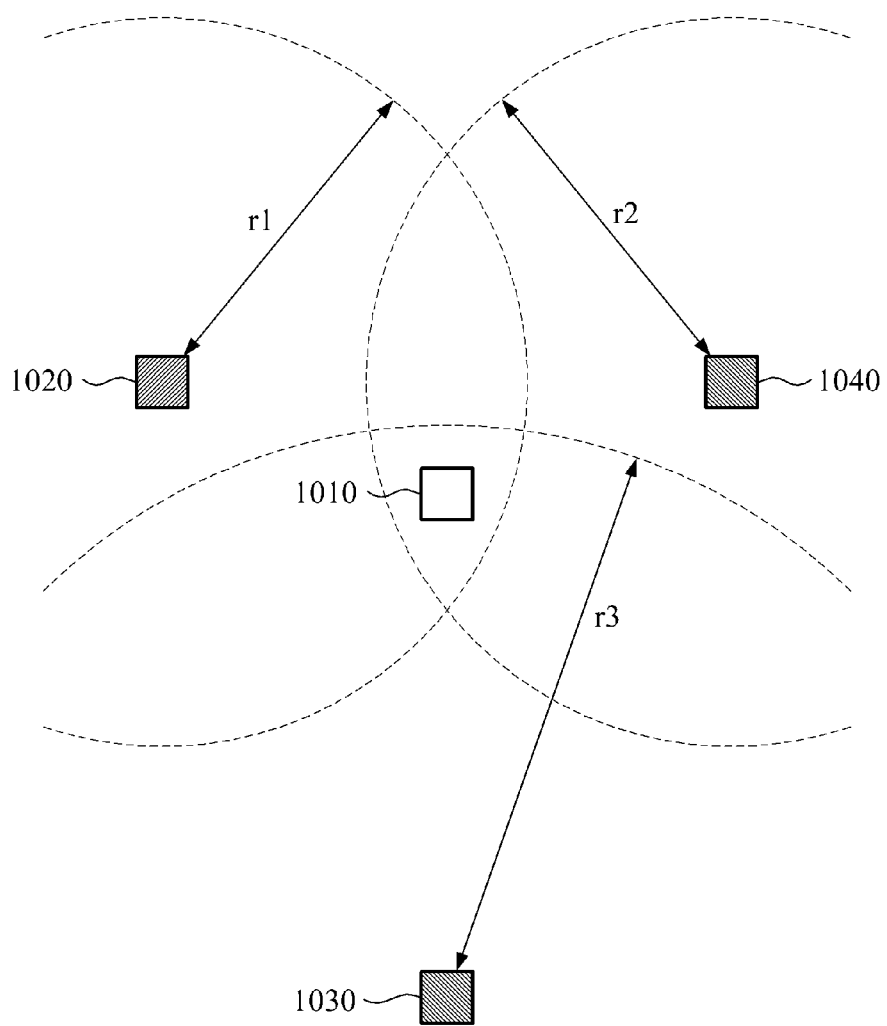
FIG. 10 illustrates a rendering process according to example embodiments.

FIG. 10 illustrates a rendering process according to example embodiments.

Referring to FIG. 10, three VPLs 1020, 1030, and 1040 are assumed to influence a first point 1010.

As described above, according to example embodiments, the VPLs 1020, 1030, and 1040 have a radius that may be set differently based on at least one of brightness of a direct light associated with sampling, a position at which sampling is performed, a normal direction, a texture, a color value, or a reflectivity. As used herein, the term "radius" may be also referred to as a "radius of influence" or a "first radius".

When the first point 1010 is included within a radius influenced by a first VPL, the first VPL is calculated to influence the first point 1010.

In rendering, the first point 1010 is within a radius "r1" influenced by the VPL 1020 from the VPL 1020, within a radius "r2" influenced by the VPL 1040 from the VPL 1040, and within a radius "r3" influenced by the VPL 1030 from the VPL 1030.

Accordingly, a color value calculated based on Equation 1 is summed to a color value of the first point 1010 with respect to the VPL 1020 and the first point 1010.

For example, when the visibility probability distribution map 900 of FIG. 9 corresponds to the first point 1010, and the VPL 1020 is at a position included in the area 920 of the visibility probability distribution map 900, a visibility between the first point 1010 and the VPL 1020 is zero. Accordingly, the VPL 1020 may not influence the color value of the first point 1010.

Therefore, a visibility between the first point 1010 within the radius "r1" influenced by the VPL 1020 and the VPL 1020 is determined to be zero. The radius "r1" influenced by the VPL 1020 is determined based on a position, a normal direction, a texture, a color value, or a reflectivity of the VPL 1020. However, the visibility probability distribution map 900 with respect to the first point 1010 is calculated based on a geometric structure of a 3D model.

In a similar manner, the color value calculated based on Equation 1 is summed to a color value of the first point 1010 with respect to the VPL 1040 and the first point 1010.

When the VPL 1040 is at a position included in the area 940 of the visibility probability distribution map 900, a visibility between the first point 1010 and the VPL 1040 is "0.4". Accordingly, a color value to which the visibility "0.4" is applied based on Equation 1 is also applied to a color value of the first point 1010.

The color value calculated based on Equation 1 is summed to a color value of the first point 1010 with respect to the VPL 1030 and the first point 1010.

When the VPL 1030 is at a position included in the area 930 of the visibility probability distribution map 900, a visibility between the first point 1010 and the VPL 1030 is "0.1". Accordingly, a color value to which the visibility "0.1" is applied based on Equation 1 is also summed to a color value of the first point 1010.

The color value of the first point 1010 is calculated through such a process above-described. A visibility test using a direct shadow map and additional color shading may be performed on at least one second VPL outside a screen scene. Such shading by a direct light is applied to the color value of the first point 1010.

Figure 11:
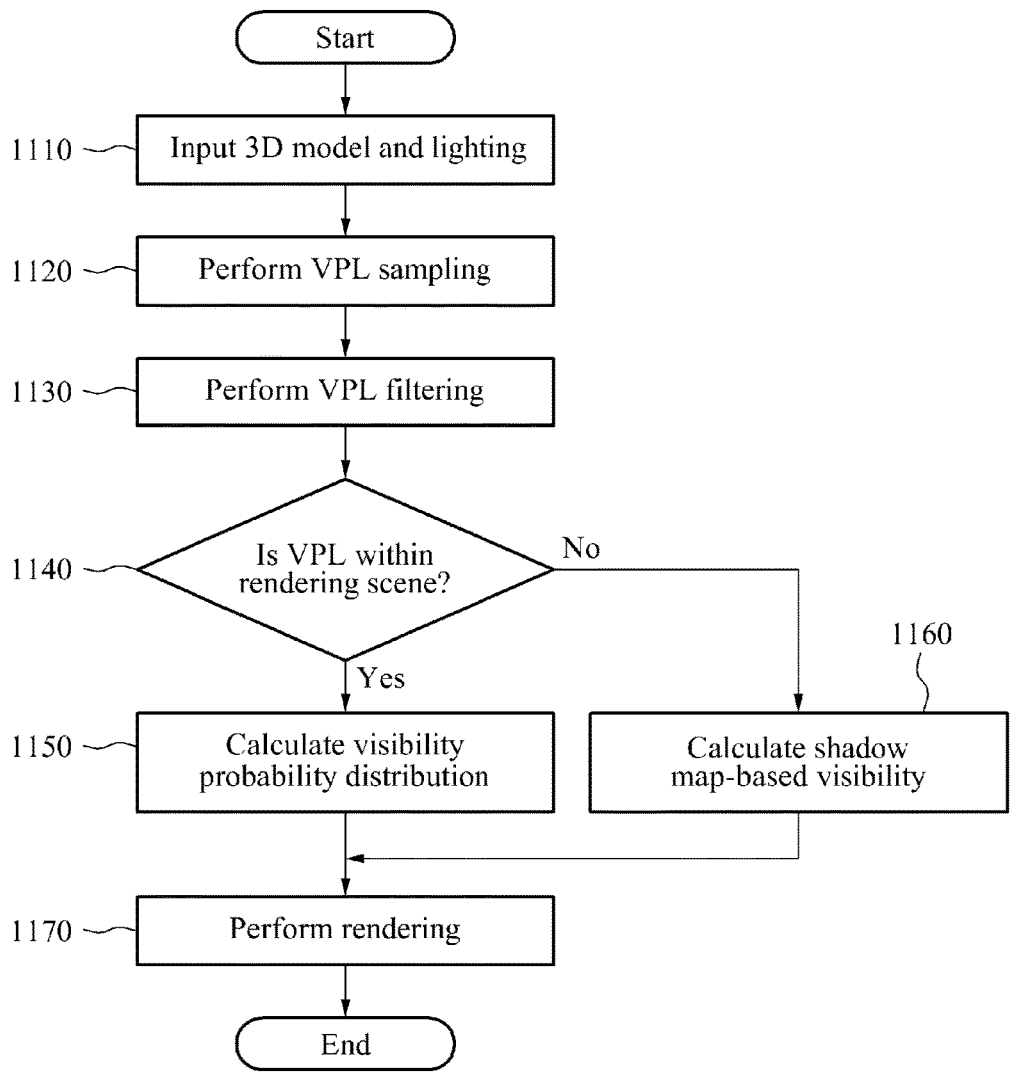
FIG. 11 illustrates an image processing method according to example embodiments.

FIG. 11 illustrates an image processing method according to example embodiments.

In operation 1110, a 3D model to render and a direct lighting are input. In this example, a camera viewpoint to be rendered is set.

According to example embodiments, in operation 1120, the VPL sampler 310 of FIG. 3 samples at least one VPL to the 3D model. For example, such sampling may be importance-based adaptive VPL sampling. A description of operation 1120 will be provided later with reference to FIG. 12.

According to example embodiments, in operation 1130, the VPL filter 320 distinguishes first VPLs within a screen scene space from second VPLs outside the screen scene space. Such a process may be referred to as pre-filtering, in which shadow map-based rendering and rendering based on a visibility probability distribution map may be performed on the VPLs in parallel.

In operation 1150, a visibility test based on a visibility probability distribution amongst pixels is performed on the first VPLs that are determined to be VPLs within a screen scene to be rendered in operation 1140. Descriptions pertaining to the visibility test performed based on the visibility probability distribution will be provided later with reference to FIG. 13.

In operation 1160, a shadow map-based visibility test is performed on the second VPLs determined to be VPLs outside the screen scene.

In operation 1170, color shading is performed on VPLs for which a first point is within a radius of influence based on a visibility probability distribution map and Equation 1, and color shading is performed on the second VPLs based on a shadow map-based visibility and Equation 1. A color value of the first point is determined by rendering by a direct light. The entire aforementioned process may be referred to as rendering, and reference may be made to descriptions provided with reference to FIG. 10 for pertinent details.

Figure 12:
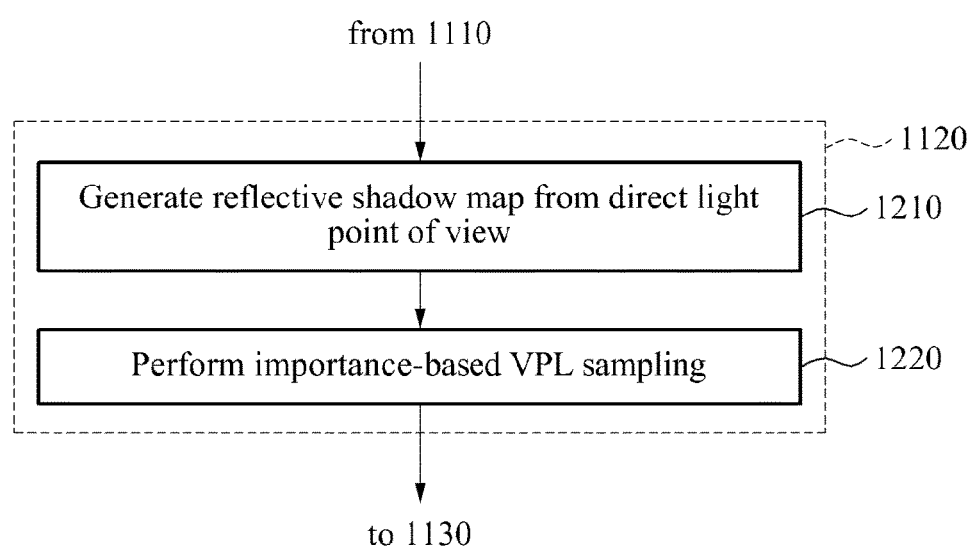
FIG. 12 illustrates a VPL sampling process according to example embodiments.

FIG. 12 illustrates a VPL sampling process 1120 according to example embodiments.

In operation 1210, a reflective shadow map is generated from a direct light source viewpoint. In operation 1220, importance-based adaptive VPL sampling is performed.

As discussed above with reference to FIG. 3, according to example embodiments, VPL sampling is adaptively performed based on a complexity of a screen scene during the importance-based adaptive VPL sampling in operation 1220. For example, a relatively great number of VPLs is sampled for a portion having higher complexity, and a relatively small number of VPLs is sampled for a portion having lower complexity.

Also, a relatively great number of VPLs is sampled for a portion having a visibility from a camera viewpoint to render, and a relatively small number of VPLs is sampled for a portion absent a visibility from the camera viewpoint to be rendered.

A relatively great number of VPLs is sampled as a reflectivity increases and/or brightness of a color increases based on a texture of the 3D model.

Figure 13:
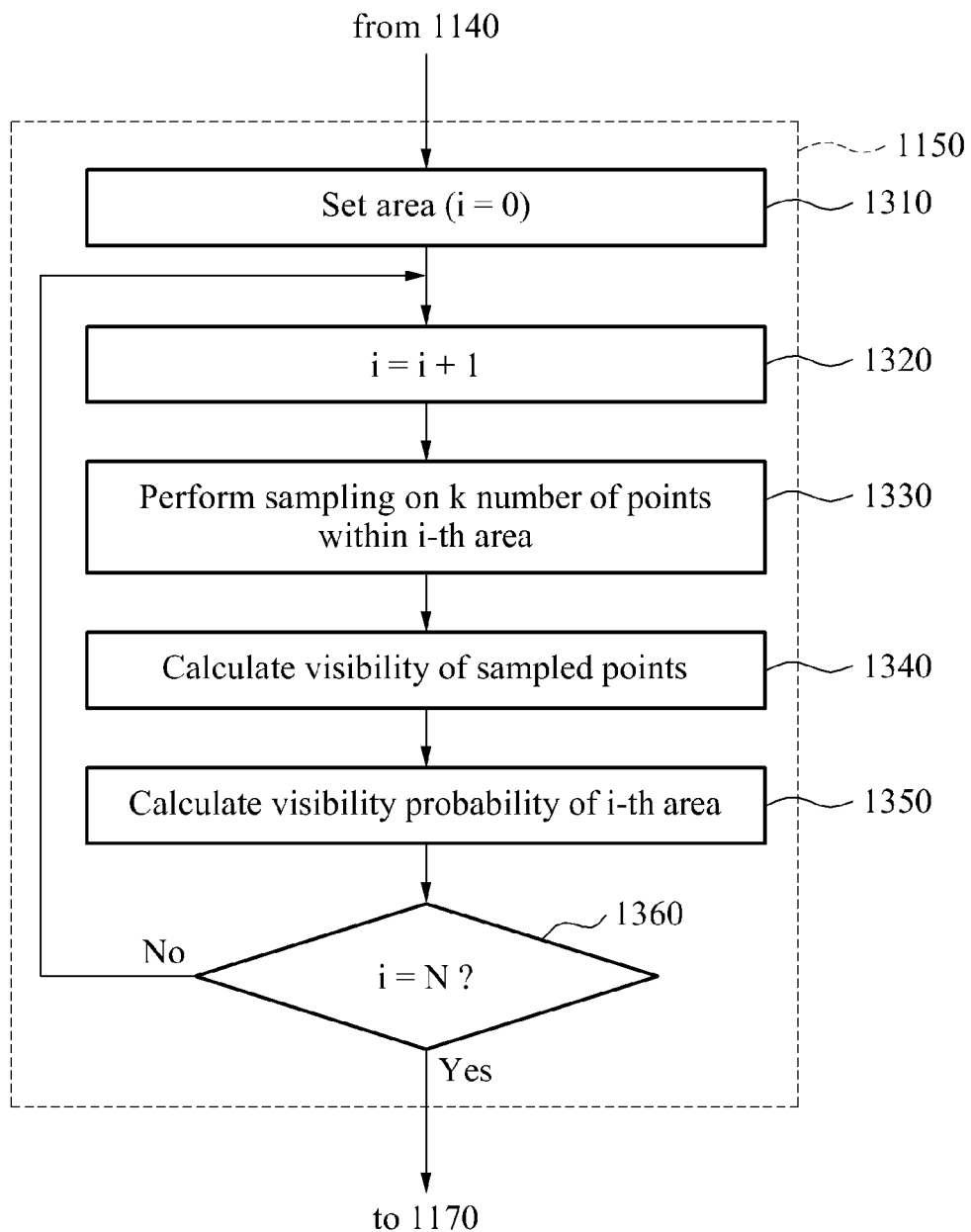
FIG. 13 illustrates a process of calculating a visibility probability distribution according to example embodiments.

FIG. 13 illustrates a process 1150 of calculating a visibility probability distribution according to example embodiments.

Referring to FIG. 7, in operation 1310, N number of areas, N being a natural number, is set in a screen scene to calculate a visibility probability distribution with respect to the first point 701.

By iterating operations 1320 through 1360, a visibility probability is calculated with respect to the N number of areas.

In operation 1330, k number of second points, k being a natural number, in an i-th area are sampled. As shown in FIG. 7, such sampling may be performed in a predetermined manner but is not limited thereto. The number k of sampled second points may be predetermined. According to example embodiments, to increase accuracy, k is set to be greater the closer the second points are to the first point 701. For a rapid operation, k is set to be less the more distant the second points are from the first point 701. In the example described with reference to FIG. 7, k is ten.

In operation 1340, visibilities of the k number of sampled second points are calculated with respect to the first point 810. Such a visibility calculation may be a visibility test using a depth map obtained as a result of differed rendering. Further details pertaining to such visibility test corresponds to appropriate descriptions as per the visibility test illustrated in FIG. 8.

When the aforementioned process with respect to the i-th area is performed on all of N number of areas through iteration as shown in operation 1350, the calculation of the visibility probability distribution with respect to the first point is completed. Rendering is performed in operation 1170 of FIG. 11, and details related to the rendering are discussed in the preceding.

According to example embodiments, as an operational overhead for a shadow map calculation and a visibility test is minimized, radiosity rendering with improved visibility accuracy is made available when compared to relatively simple splatting rendering.

The units described herein may be implemented using hardware components, software components, or a combination thereof. For example, a processing device may be implemented using one or more general-purpose or special purpose computers, such as, for example, a processor, a controller and an arithmetic logic unit (ALU), a digital signal processor, a microcomputer, a field programmable array (FPA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer-readable media may also be a distributed network, so that the program instructions are stored and executed in a distributed fashion. The program instructions may be executed by one or more processors. The non-transitory computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined by the claims and their equivalents.

What is claimed is:

1. An image processing apparatus, comprising:
a processor configured to
obtain a three-dimensional (3D) model comprising a first point to render;
generate a screen scene of the 3D model from a camera viewpoint;
divide the screen scene into a plurality of areas including a first area;
sample a first set of virtual point lights (VPLs) to the first area;
calculate a probability of a first visibility between the first area and the first point based on the first set of VPLs, wherein the probability is calculated as a ratio of a number of VPLs having a visibility of "1" to a total number of VPLs in the first set of VPLs;
obtain a first VPL from the first area;
calculate a first visibility between the first VPL and the first point by assigning, as the first visibility, the probability of the first area; and
render a color value of the first point based on the first visibility.

2. The apparatus of claim 1, wherein the processor is further configured to:
determine the total number of VPLs in the first set of VPLs of the first area;
determine, for each VPL in the first set of VPLs, whether a respective visibility between the respective VPL and the first point exists,
wherein, if the respective visibility of the respective VPL exists, the respective visibility is assigned a value of "1"; and
calculate, as the first probability, the ratio of the number of VPLs having a visibility of "1" to the total number of VPLs in the first set of VPLs.

3. The apparatus of claim 2, wherein the processor is further configured to determine whether the respective visibility of a respective VPL of the first set of VPLs exists based on a depth map of the screen scene.

4. The apparatus of claim 1, wherein the processor is further configured to:
determine a section of the screen scene having a distance from the first point less than a threshold value; and
divide the screen scene into the plurality of areas.

5. The apparatus of claim 1, wherein the processor is further configured to:
sample a plurality of VPLs to the 3D model;
extract, as the first set of VPLs, VPLs among the plurality of VPLs comprised in the screen scene of the 3D model from the camera viewpoint; and
extract, as a second set of VPLs, VPLs among the plurality of VPLs positioned outside the screen scene of the 3D model from the camera viewpoint.

6. The apparatus of claim 5, wherein the processor is further configured to:
extract at least one VPL from the second set of VPLs; and
determine a second visibility between the at least one VPL and first point based on a shadow map generated for the at least one VPL.

7. The apparatus of claim 6, wherein the processor is further configured to extract the at least one VPL based on a brightness of the at least one VPL relative to remaining VPLs of the second set of VPLs.

8. The apparatus of claim 6, wherein the processor is further configured to render the color value of the first point based on the first visibility and the second visibility.

9. The apparatus of claim 1, wherein the processor is further configured to:
sample an additional VPL to the screen scene;
set a radius of the additional VPL based on any one or any combination of any two or more of a brightness of a direct light associated with sampling the additional VPL, a reflectivity at a position of the additional VPL, or an object texture at the position of the additional VPL;
determine whether the first point is within the radius; and
upon determining that the first point is within the radius, render the color value of the first point based on an additional visibility of the additional VPL.

10. The apparatus of claim 9, wherein the processor is further configured to:

upon determining that the first point is within the radius, determine one area among the plurality of areas in which the additional VPL is located;

calculate the additional visibility between the additional VPL and the first point by assigning, as the additional visibility, a probability of a visibility between the one area and the first point; and render the color value of the first point based on first visibility and the additional visibility.

11. The apparatus of claim 1, wherein the plurality of areas further includes a distant area having a distance from the first point that is greater than a threshold.

12. The apparatus of claim 11, wherein the processor is further configured to calculate a distant probability of a visibility between the distant area and the first point to be zero.

13. The apparatus of claim 1, wherein the processor is further configured to:

divide the screen scene into the plurality of areas including a second area;

sample a second set of VPLs to the second area;

calculate a second probability of a second visibility between the second area and the first point based on the second set of VPLs;

generate a visibility probability distribution map comprising the probability and the second probability; and render the color value of the first point based on the first visibility and the visibility probability distribution map.

14. The apparatus of claim 1, wherein the processor is further configured to render the color value of the first point based on the first visibility and on any one or any combination of any two or more of a first direction vector from a position of the first point towards a position of the first VPL, a second direction vector from the position of the first VPL towards the position of the first point, a first normal vector of the first point, a second normal vector of the first VPL, a texture color value based on a texture of the first point, or a VPL color value of the first VPL.

15. An image processing method for rendering, on a display, a color value of a first point comprised in a three-dimensional (3D) model, the method comprising:

obtaining, by a processor, the 3D model comprising the first point;

generating a screen scene of the 3D model from a camera viewpoint;

dividing the screen scene into a plurality of areas including a first area;

sampling a first set of virtual point lights (VPLs) to the first area;

calculating a probability between the first area and the first point based on the first set of VPLs, wherein the probability is calculated as a ratio of a number of VPLs having a visibility of "1" to a total number of VPLs in the first set of VPLs;

obtaining a first VPL from the first area;

calculating a first visibility between the first VPL and the first point by assigning, as the first visibility, the probability of the first area;

rendering, on the display, a color value of the first point based on the first visibility.

16. The method of claim 15, wherein the calculating of the probability comprises:

determining the total number of VPLs in the first set of VPLs of the first area;

determining, for each VPL in the first set of VPLs, whether a respective visibility between the respective VPL and the first point exists, wherein, if the respective visibility of the respective VPL exists, the respective visibility is assigned a value of "1"; and calculating, as the first probability, the ratio of the number of VPLs having a visibility of "1" to the total number of VPLs in the first set of VPLs.

17. The method of claim 15, further comprising:

sampling a plurality of VPLs to the 3D model;

extracting, as the first set of VPLs, VPLs among the plurality of VPLs comprised in the screen scene of the 3D model from the camera viewpoint; and extracting, as a second set of VPLs, VPLs among the plurality of VPLs positioned outside the screen scene of the 3D model from the camera viewpoint.

18. A non-transitory computer-readable recording medium comprising a program for instructing a computer to perform the method of claim 15.

19. An image processing apparatus, comprising:

a processor configured to divide a screen scene of a three-dimensional (3D) model including a first point to render into a plurality of areas;

sample, to each area of the plurality of areas, a respective set of virtual point lights (VPLs);

calculate, for each area of the plurality of areas, a respective probability of a respective visibility between the each area and the first point based on the respective set of VPLs, wherein the respective probability is calculated as a ratio of a number of VPLs having a visibility of "1" to a total number of VPLs in the respective set of VPLs;

generate a visibility probability distribution map comprising the respective probability of each area of the plurality of areas;

obtain at least one VPL; and render a color value of the first point based on the at least one VPL and the visibility probability distribution map.

20. The apparatus of claim 19, wherein the processor is further configured to:

determine an area of the plurality of areas in which the at least one VPL is located;

extract, from the visibility probability distribution map, a respective probability of the area in which the at least one VPL is located; and render the color value of the first point based on the at least one VPL and the extracted respective probability.

* * * * *